United States Patent
Emerson et al.

(10) Patent No.: US 12,406,570 B2
(45) Date of Patent: Sep. 2, 2025

(54) DEPLOYING PROCESS AUTOMATION ALARMS TO DISTRIBUTED CONTROL NODES

(71) Applicant: Yokogawa Electric Corporation, Tokyo (JP)

(72) Inventors: David Emerson, Coppell, TX (US); Patrick Clay, Frisco, TX (US); Vien Nguyen, Frisco, TX (US); Hidenori Sawahara, Spring, TX (US)

(73) Assignee: Yokogawa Electric Corporation, Tokyo (JP)

( * ) Notice: Subject to any disclaimer, the term of this patent is extended or adjusted under 35 U.S.C. 154(b) by 12 days.

(21) Appl. No.: 18/090,333

(22) Filed: Dec. 28, 2022

(65) Prior Publication Data

US 2024/0221492 A1    Jul. 4, 2024

(51) Int. Cl.
*G08B 29/18* (2006.01)
(52) U.S. Cl.
CPC .................................. *G08B 29/18* (2013.01)
(58) Field of Classification Search
CPC ...................................................... G08B 29/18
See application file for complete search history.

(56) References Cited

U.S. PATENT DOCUMENTS 6,205,362 B1 * 3/2001 Eidson ............... G05B 19/0421
706/45

7,551,072 B2 * 6/2009 Tambascio ............. G08B 29/04
340/521
10,410,493 B2   9/2019 Rischar et al.
11,650,892 B1   5/2023 Joyner
(Continued)

FOREIGN PATENT DOCUMENTS

CN      111416731         7/2020
CN      111416731 A   *   7/2020
(Continued)

OTHER PUBLICATIONS

International Search Report and Written Opinion issued for Application No. PCT/IB2023/06299, 8 pages, dated Mar. 19, 2024.

*Primary Examiner* — Curtis A Kuntz
*Assistant Examiner* — James E Munion
(74) *Attorney, Agent, or Firm* — Gray Ice Higdon

(57) ABSTRACT

Implementations relate to storing, in alarms database for a process automation system, an association of an alarm configuration file to a function block identifier of a function block that corresponds to the alarm configuration file. Some implementations relate to a node transmitting, via a process automation network, an alarm configuration request that includes the function block identifier and receiving, in response to the request and via the network, the alarm configuration file. The node can include the function block identifier in the alarm configuration request based on the corresponding function block being executed by the node and/or being utilized in alarm monitoring by the node. Some implementations additionally or alternatively relate to receiving the alarm configuration request, and identifying the alarm configuration file based on it being stored, in the alarms database, in association with the function block identifier of the alarm configuration request.

20 Claims, 7 Drawing Sheets

(56) References Cited

U.S. PATENT DOCUMENTS

| | | | |
|---|---|---|---|
| 2008/0125877 A1* | 5/2008 | Miller | G05B 15/02 |
| | | | 707/999.107 |
| 2012/0310381 A1 | 12/2012 | Karaffa et al. | |
| 2016/0065656 A1* | 3/2016 | Patin | H04L 67/10 |
| | | | 709/201 |
| 2018/0077109 A1* | 3/2018 | Hoeme | H04L 61/4511 |
| 2018/0109955 A1* | 4/2018 | Nixon | H04L 67/75 |
| 2019/0102401 A1 | 4/2019 | Neel et al. | |
| 2019/0355228 A1* | 11/2019 | Rischar | G08B 31/00 |
| 2021/0064004 A1 | 3/2021 | Kurokawa | |
| 2022/0011756 A1* | 1/2022 | Hoernicke | G06F 9/44542 |
| 2022/0086037 A1 | 3/2022 | Géhberger et al. | |
| 2022/0303338 A1* | 9/2022 | Nguyen | H04L 41/082 |
| 2022/0308542 A1* | 9/2022 | Clay | H04L 41/0806 |
| 2022/0308555 A1* | 9/2022 | Malm | G05B 19/41845 |
| 2022/0311700 A1 | 9/2022 | Wang et al. | |

FOREIGN PATENT DOCUMENTS

| | | | | |
|---|---|---|---|---|
| CN | 111508214 | | 8/2020 | |
| CN | 111508214 A | * | 8/2020 | ........... G08B 25/008 |
| JP | 200255713 | | 2/2002 | |
| JP | 200262933 | | 2/2002 | |
| JP | 2002149232 | | 5/2002 | |
| JP | 2005531826 | | 10/2005 | |

* cited by examiner

DEPLOYING PROCESS AUTOMATION ALARMS TO DISTRIBUTED CONTROL NODES

BACKGROUND

Alarms are utilized in process automation systems to detect potential anomalies and to cause action(s) to be performed responsive to detecting a potential anomaly. A potential anomaly can be one with the process automation system and/or one with the process automation process for which the process automation system is deployed. The action(s) for an alarm can include, for example, causing a corresponding notification to be rendered at interface(s) monitored by operator(s) and/or automatically causing remediation(s) to be performed (e.g., an automation process or sub-process automatically halted or throttled). As an example, an alarm can be configured to monitor sensor readings, from a sensor of the process automation system, and to cause a corresponding notification to be rendered if the sensor readings are above a high value (and/or a high-high value) and/or are below a low value (and/or a low-low value).

In some process automation systems, hardware and/or software of process automation control nodes, of the process automation system, can all be supplied and/or managed by a single entity (e.g., a single company). This enables the single entity to utilize its own proprietary techniques to create and manage alarms that are associated with corresponding process automation control nodes.

However, other process automation systems include heterogeneous hardware and/or heterogeneous software that are supplied and/or managed by a plurality of entities and/or that are deployed in a distributed manner. For example, a process automation system can include some process automation control nodes that are supplied and/or managed by a first entity, other process automation control nodes that are supplied and/or managed by a second entity, etc. Each process automation control node can have different hardware and/or software specifications, including different function block(s) that define control(s) performed by the process automation control node.

A process automation control node can include a distributed control node (DCN) that includes hardware (e.g., processor(s), memory, network interface(s), input and/or output port(s), and/or other hardware) as well as software (e.g., function block(s)) that is executed by at least some of the hardware. For example, the software can be included in memory of the DCN and can be executed by processor(s) of the DCN. The software of a DCN can, for example, utilize data from input port(s) of the DCN and/or data from other DCN(s) during execution and/or can generate output for providing over output port(s) and/or a network interface (e.g., transmitting to one or more endpoint(s) via a process automation network of the process automation system).

SUMMARY

Various technical challenges are presented in generating, updating, and/or deploying process automation alarms in a process automation system that includes distributed and/or heterogeneous hardware and/or software. For example, a process automation alarm can require monitoring, by an alarm engine, of process variable(s) of particular function block(s), such as input variable(s), output variable(s), and/or internal variable(s) of the particular function block(s). The DCN(s) generating and/or enabling access to process variable(s) must be accessible to the alarm engine to enable monitoring of those process variable(s) by the alarm engine. Further, the alarm engine must have access to and utilize appropriate alarm configuration file(s) in monitoring for occurrence of corresponding alarm condition(s) and causing corresponding action(s) to occur in response. An alarm configuration file can define condition(s), for corresponding process variable(s) that when satisfied, cause the alarm engine to initiate corresponding action(s). Yet further, when the action(s) include initiating rendering (e.g., visual and/or audible rendering) of corresponding output at an alarm viewer, establishment of a connection-oriented connection between the alarm engine and the alarm viewer may be required or desired. However, due to the distributed and/or heterogeneous nature of the process automation system, achieving one or more of such requirements can be cumbersome and/or error prone.

As one example, assume that an alarm configuration file is locally stored on a particular DCN and is being utilized, by a local alarm engine of the particular DCN, in monitoring process variable(s) of a particular function block on the particular DCN (e.g., monitoring values for those variable(s) during execution of the particular function block). Further assume that the alarm configuration file is locally stored and utilized by the particular DCN based on being pre-loaded on the particular DCN (prior to commissioning of the DCN in the process automation system) or based on being manually configured via a human-machine interface (HMI) coupled to the DCN during commissioning. If the particular DCN is replaced with a new DCN, executing the same function block(s), it can require manual pre-loading of the alarm configuration file on the new DCN or manually configuring the new DCN via the HMI. Likewise, if the particular function block and/or the alarm engine are removed from the particular DCN and newly implemented on an alternative DCN, manual reassigning of the alarm configuration file to the alternate DCN can be required. In addition to manual reassigning being cumbersome and requiring utilization of computing resource(s), error(s) in the manual reassigning can result in corresponding alarm(s) not being truly active or not being accurate (e.g., due to incorrect condition(s) being defined). This results in lack of monitoring for occurrence of the condition(s) of the alarm(s), and lack of any corresponding action(s) being taken—which can result in hazardous conditions or other negative consequences in the process automation setting.

As another example, upon initial commissioning of DCNs of a process automation system there can be hundreds or thousands of alarm configuration files that need to be deployed at appropriate DCNs for effective alarm monitoring. However, due the distributed and/or heterogeneous nature of the process automation system, it can be cumbersome and/or error prone to determine which DCN is the appropriate DCN for a corresponding alarm configuration file. For example, it may not be readily apparent, out of hundreds or thousands of DCNs, which DCN's alarm engine will be tasked with utilizing a corresponding alarm configuration file. Manually locating the appropriate DCN can be cumbersome and/or error prone, which can result in the corresponding alarm configuration file being deployed to the wrong DCN and corresponding alarm monitoring not being truly active. As yet another example, after initial commissioning of the process automation system, there can be a desire to update one or more alarm configuration files to achieve more effective alarm monitoring. However, determining which DCN(s) utilize the alarm configuration file(s) that are to be updated can likewise be cumbersome and/or error prone.

Implementations disclosed herein address these and other challenges by assigning, in an alarms database accessible via a process automation network, each alarm to a corresponding function block identifier. The function block identifier assigned to an alarm can be an alias of the function block corresponding to the alarm, and can be unique relative to the aliases of all other function blocks of the process automation system. The assignment of an alarm to the function block identifier can be an assignment of an alarm configuration file to the function block identifier. Further, the assignment of the alarm to the function block identifier can be in addition to (or in lieu of) any assignment of the alarm to a corresponding DCN identifier, such as network addressable identifier of the DCN (e.g., an IP address or a MAC address of the DCN).

For example, a given function block can have a function block identifier of "FT101.PV". The function block identifier "FT101.PV" can be generated by a programmer of the given function block when creating the given function block, or can be automatically created, and can be created or generated so that it is unique relative to all other function block identifiers of all other function blocks of the process automation system. In some implementations, part of the function block identifier can indicate a type of the function block and can conform to a standardized type designation scheme. For example, "PV" in "FT101.PV" can indicate the function block is of a "process variable" type. Also, for example, ".AI" can indicate a function block of an "analog input" type, ".AO" can indicate a function block of an "analog output" type, and/or ".PID" can indicate a function block of a "proportional-integral-derivative" type. In some of those or other implementations, at least part of the function block identifier may not conform to any standardized designation scheme, but may be semantically meaningful and/or conform to a non-standardized designation scheme of programmer(s) and/or an entity (or entities) implementing the process automation system. "FT101", in "FT101.PV", is an example of such a part of a function block identifier. For example, in a process automation system there may be multiple function block identifiers that end in ".PV". However, only one of those will include "FT101" before the ".PV" and, further, all of those will include unique character(s), relative to one another, before the ".PV".

An alarm configuration file, assigned to the given function block, can be generated (e.g., by an engineer or other human operator) and can dictate condition(s), of process variable(s) of the given function block, and corresponding action(s) that should occur if the condition(s) are satisfied. For example, an alarm configuration file for "FT101.PV" can dictate condition(s), of a process variable of "FT101.PV", and can dictate descriptor(s) or other notification(s) that should be presented (e.g., in an alarm viewer) if corresponding condition(s) are satisfied. For instance, the condition(s) can include the process variable exceeding a threshold rate of change over a specified time, or can include the process variable being out of range of high-high, high, low, and/or low-low setpoint value(s).

Implementations further address the aforementioned and/or other technical challenges by enabling a process automation node, such as a DCN, to transmit, via a process automation network, an alarm configuration request that includes function block identifier(s). The DCN can include the function block identifier(s) in the alarm configuration request based on the corresponding function block(s) being executed by the DCN and/or being assigned for use in alarm monitoring by the DCN. For example, the DCN can include a function block identifier in the alarm configuration request in response to the corresponding function block being executed by the DCN. As another example, the DCN can include the function block identifier in the alarm configuration request in response to the corresponding function block being monitored by an alarm engine of the DCN (e.g., an alarm engine executed by a server implemented by the DCN). A function block, monitored by an alarm engine of a DCN, can be one that is also executed by the DCN or it can be one that is executed by an additional DCN, but nonetheless monitored by the DCN via communications between the DCN and the additional DCN. The communications between the DCN and the additional DCN can be via the process automation network and/or via another channel.

An alarm configuration service can be implemented on one or more server(s) coupled to the process automation network, and can manage the alarms database. The alarm configuration service can receive the alarm configuration request from the DCN and search the alarms database, using the function block identifier(s) of the request, to retrieve alarm configuration file(s) that are assigned to the function block identifier(s) in the alarms database. The alarm configuration service can transmit, in response to the alarm configuration request, the retrieved alarm configuration file(s) to the DCN for implementation thereof by an alarm engine of the DCN. In these and other manners, a newly commissioned DCN (e.g., commissioned upon initial commissioning of the process automation system or commissioned to replace a removed DCN) can obtain appropriate alarm configuration file(s) to implement utilizing only function block identifier(s) of function block(s) that are utilized by (e.g., executed by and/or assigned for use in alarm monitoring by) the newly commissioned DCN. Further, the alarm configuration service can optionally retrieve and provide the alarm configuration file(s) without any reference to a DCN identifier of the particular DCN on which the given function block will be implemented. Additionally or alternatively, a DCN with update(s) (e.g., removals or additions) to its utilized function block(s) can obtain appropriate alarm configuration files to implement utilizing only function block identifier(s) of function block(s) implemented by the DCN.

Utilization of assignment of the alarms to function block identifiers, in deploying alarms according to implementations disclosed herein, can enable alarm deployment that is robust in the distributed and/or heterogeneous process automation system setting and/or that mitigates errors in such a setting. For example, utilization of function block identifiers, in lieu of DCN identifiers, in determining which alarm configuration file(s) to provide in response to an alarm configuration request, can mitigate issues that might otherwise arise with old DCNs being replaced with new DCNs (with new DCN identifiers), alarm engine monitoring functionality being switched from a given DCN (with a given DCN identifier) to alternate DCN(s) (with alternate DCN identifier(s)), etc.

In various implementations, an alarm configuration request can be issued by a DCN responsive to the DCN detecting occurrence of one or more alarm configuration conditions. For example, an alarm configuration request can be issued by a DCN responsive to the DCN determining it is newly commissioned (e.g., newly added to the process automation system), determining it has been powered up (e.g., initially or after a restart), determining that its alarm engine is assigned to monitor function block(s) but that monitoring not being currently active (e.g., due to lacking any alarm configuration file(s) for the function block(s)), determining that is has been more than a threshold duration of time since it last issued an alarm configuration request, receiving an update request from the alarm configuration service, and/or detecting occurrence of other condition(s). Causing a DCN to issue the alarm configuration request in response to detecting such certain condition(s) can ensure that the DCN proactively seeks alarm configuration file(s) in situation(s) where they are likely needed. Additionally or alternatively, by preventing issuance of an alarm configuration request by the DCN when the certain condition(s) are not detected, resources of the process automation system can be conserved. For example, network resources can be conserved such as those utilized in transmitting the alarm configuration request from the DCN to the alarm configuration service and/or those utilized by the alarm configuration service in responding to the alarm configuration request.

In some implementations, the alarm configuration request issued by the DCN (or a separate transmission, from the DCN, provided in conjunction with the alarm configuration request) can also include a DCN identifier (e.g., an IP address and/or a MAC address) of the particular DCN. In some of those implementations, the alarm configuration service can, based on the alarm configuration request including the function block identifier and the DCN identifier, update the alarms database to assign the DCN identifier to the alarm configuration file (returned responsive to the alarms configuration request) and/or to the function block identifier (included in the alarms configuration request).

The DCN identifier assigned in the alarms database can thereafter be used for one or more purposes. Such purpose(s) can include utilization of the DCN identifier to establish a connection-oriented communication session with the DCN. For example, the DCN identifier can be used to establish a Transmission Control Protocol (TCP) communication session between the DCN and an alarm viewer engine via which an alarm engine of the DCN can provide, to the alarm viewer engine, indication(s) related to active and, optionally inactive alarm(s). Such purpose(s) can additionally or alternatively include utilization of the DCN identifier to push alarm configuration file updates to the particular DCN. For example, if an alarm configuration file is updated (e.g., by an engineer) a notification can be transmitted to the particular DCN using the DCN identifier, and can be transmitted using the DCN identifier based on it being assigned to the alarm configuration file. The notification can cause the particular DCN to then issue an alarm configuration request with corresponding function block identifier(s), resulting in the particular DCN receiving the updated alarm configuration file.

A new DCN identifier can be assigned, to the alarm configuration file and/or the function block identifier and in the alarms database, in response to a later alarm configuration request (or other transmission) that includes the function block identifier and the new DCN identifier. For example, assume the particular DCN is replaced with a replacement DCN having a new DCN identifier. In response to the replacement DCN transmitting the alarm configuration request, the alarm configuration service can supplant, in the database, the assignment(s) of the DCN identifier with assignment(s) of the new DCN identifier to the alarm configuration file and/or to the function block identifier.

Accordingly, implementations disclosed herein enable effective deployment of alarm configuration files to appropriate process automation nodes as those process automation nodes are brought online in a newly commissioned process automation system. Further, implementations additionally or alternatively enable robust adaptation to replacement and/or modification of process automation nodes and/or other system component(s) in an active process automation system. For example, implementations enable robust alarm adaptation when a function block is removed from execution and/or alarm monitoring at a first DCN and redeployed for execution and/or alarm monitoring at a second DCN. Also, for example, implementations enable robust alarm adaptation when a first DCN executing and/or monitoring first function blocks is replaced by a second DCN (e.g., with different hardware specification(s)) also executing and/or monitoring the first function blocks.

The above description is provided as an overview of some implementations of the present disclosure. Further description of those implementations, and other implementations, are described in more detail below.

In addition, some implementations include one or more processors of one or more devices, where the one or more processors are operable to execute instructions stored in associated memory, and where the instructions are configured to cause performance of any of the aforementioned methods. The processor(s) can include various hardware processors such as central processing unit(s) (CPU(s)), application-specific integrated circuit(s) (ASIC(s)), field-programmable gate array(s) (FPGA(s)), graphics processing unit(s) (GPU(s)), digital signal processor(s) (DSP(s)), and/or other processor(s). Some implementations additionally or alternatively include one or more transitory or non-transitory computer readable storage media storing computer instructions executable by one or more processors to perform any of the methods disclosed herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations disclosed herein relate to ensuring robust and/or accurate alarm monitoring based on function blocks implemented by DCNs of a process automation system. At least a subset of such function blocks are each utilized in implementing at least part of a corresponding at least partially automated process. As used herein, an "at least partially automated process" includes any process cooperatively implemented within a process automation system by multiple devices with little or no human intervention. One common example of an at least partially automated process is a process loop in which one or more actuators are operated automatically (without human intervention) based on output of one or more sensors. Some at least partially automated processes can be sub-processes of an overall process automation system workflow, such as a single process loop mentioned previously. Other at least partially automated processes can include all or a significant portion of an entire process automation system workflow. In some cases, the degree to which a process is automated can exist along a gradient, range, or scale of automation. Processes that are partially automated, but still require human intervention, may be at or near one end of the scale. Processes requiring less human intervention may approach the other end of the scale, which represents fully autonomous processes. Process automation in general may be used to automate processes in a variety of domains, e.g., manufacture, development, and/or refinement of chemicals (e.g., chemical processing), catalysts, machinery, and/or other domain(s).

Figure 1:
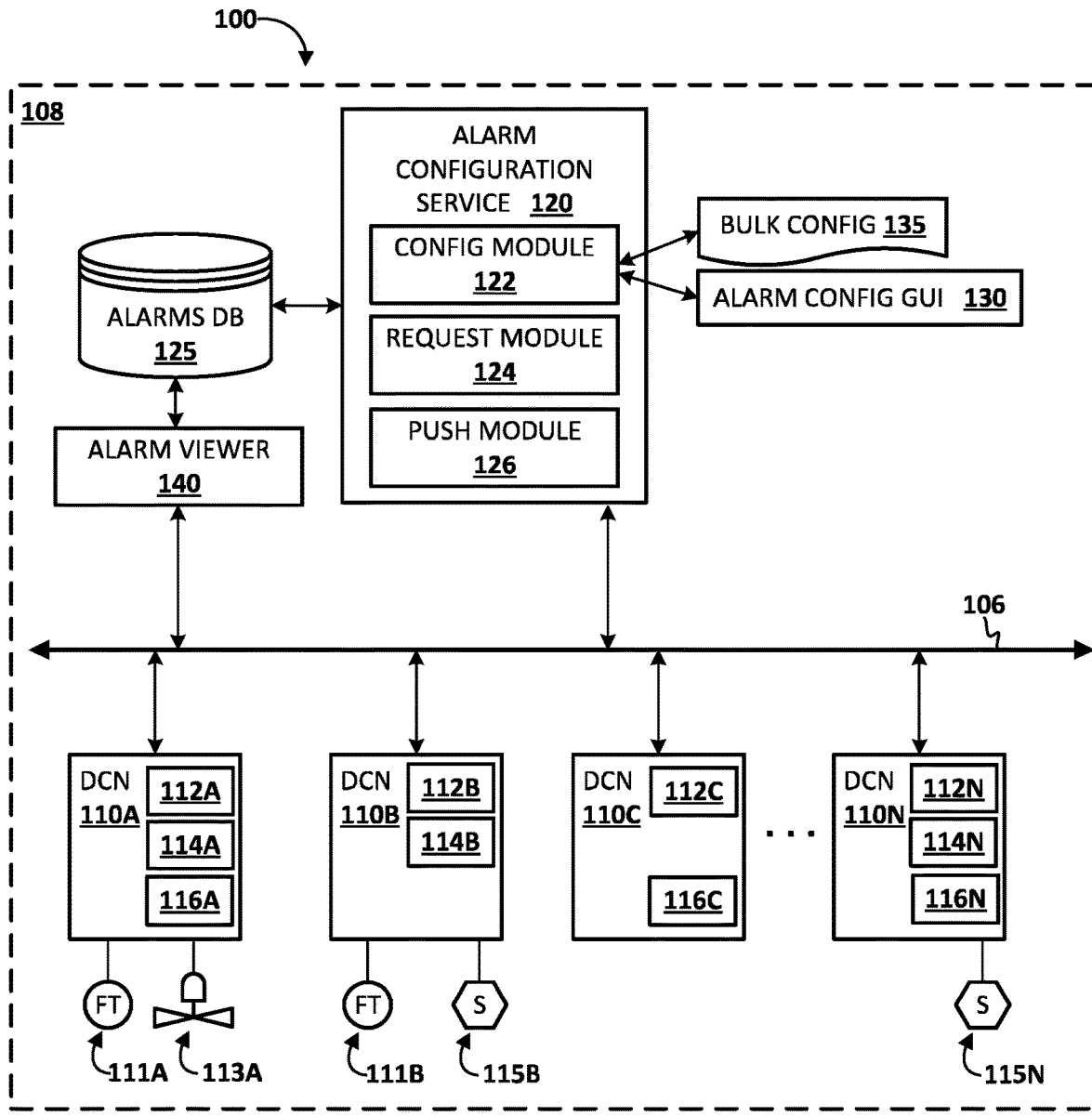
FIG. 1 illustrates an example environment in which selected aspects of the present disclosure can be implemented, in accordance with various implementations.

Referring now to FIG. 1, an example environment 100 in which various aspects of the present disclosure can be implemented is depicted schematically. Environment 100 includes a process automation system 108 that can be implemented in various industrial settings, such as part of a chemical processing plant, an oil or natural gas refinery, a catalyst factory, a manufacturing facility, or other industrial setting(s). Process automation system 108 is illustrated in FIG. 1 as including an alarm configuration service 120, an alarms database 125, an alarm configuration graphical user interface (GUI) 130, an alarm viewer 140, a process automation network 106, and distributed control nodes (DCNs) 110A-110N. The process automation system 108 can include various additional components. However, those are not illustrated in FIG. 1 for the sake of simplicity.

Process automation network 106 can be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 can be configured with redundancies and/or backups to provide high availability (HA) and/or high quality of service (QOS). Additionally, nodes that exchange data over process automation network 106 can implement time-sensitive networking (TSN) to facilitate time synchronization and/or real-time control streams. Various nodes/devices are operably coupled with process automation network 106, such as alarm configuration service 120, alarm viewer 140, and DCNs 110A-N.

DCNs 110A, 110B, 110C, and 110N are illustrated in FIG. 1. However, it is noted that additional (e.g., hundreds of or even thousands of) DCN(s) can be provided in process automation system 108, as indicated by the ellipsis between DCN 110C and DCN 110N. Some DCNs in process automation system 108 can have input(s)/output(s) (I/O(s)) for coupling with sensor(s), human machine interface(s) (HMI(s)), actuator(s), and/or other components. Other DCN(s) in process automation system 108 can optionally omit I/O(s).

DCN 110A is coupled, via a first I/O, to a flow transmitter (FT) component 111A and, via a second I/O to an actuator (e.g., a valve) 113A. The actuator 113A, and other actuators described herein, can be an electric, hydraulic, mechanical, and/or pneumatic component that is controllable to affect some aspect of a process automation workflow that occurs at process automation facility 108. The FT component 111A includes sensor(s) that provide sensor data indicating flow rate of a corresponding fluid flow and also includes actuator(s) that can be adjusted to control the corresponding fluid flow. Sensors described herein can take various forms, including but not limited to a pressure sensor, a temperature sensor, a flow sensor, various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and/or other form(s).

DCN 110A includes processor(s) 112A that can utilize associated memory (and corresponding instructions stored therein) for implementing corresponding function(s) of the DCN 110A. Those function(s) include implementing function block(s) 114A of DCN 110A, which can be stored in some of the associated memory. Those function(s) also include implementing an alarm engine 116A.

Each of the function block(s) 114A of DCN 110A can define one or more aspects of sensor monitoring and/or actuator control that is performed by DCN 110A. In some implementations, each of the function block(s) 114A is a corresponding software model that contains input/output variable(s), through variable(s), internal variable(s), and/or an internal behavior description of the function(s) to be performed by the function block. As a non-limiting example, one of the function block(s) 114A of DCN 110A can control an actuator of FT component 111A based on sensor data from sensor(s) of FT component 111A. As another non-limiting example, another of the function block(s) 114A of DCN 110A can control the actuator 113A in dependence on output(s) from other function block(s), such as other function block(s) implemented at DCN 110A and/or at other DCN(s) 110B-N.

The alarm engine 116A can optionally be implemented utilizing open standard protocol(s). For example, the alarm engine 116A can be implemented by an Open Platform Communications (OPC) Unified Architecture (OPC-UA) server that is executed on the DCN 110A by processor(s) 112A thereof. The alarm engine 116A can utilize alarm configuration file(s), described herein, in monitoring for occurrence of alarm condition(s) dictated by an alarm configuration file and performing corresponding action(s) if the alarm condition(s) are detected. The corresponding action(s)

can also optionally be dictated by the alarm configuration file. The condition(s) defined by an alarm configuration file can include, or be restricted to, those that reference process variable(s) of function block(s), such as input variable(s), output variable(s), through variable(s), and/or internal variable(s) of function block(s). The action(s) performed in response to an alarm condition being detected can include, for example, sending corresponding data to alarm viewer 140 to cause rendering, at one or more output interface(s), of a corresponding audible and/or visual alarm. The sending of the corresponding data can be via a connection-oriented communication session, between the alarm engine 116A and the alarm viewer 140, as described herein. The action(s) performed in response to an alarm condition being detected can additionally or alternatively include causing remediation(s) to be performed. For example, halting and/or altering function block(s) responsible for the alarm condition and/or related function block(s).

As one example, alarm engine 116A can monitor for condition(s) that reference process variable(s) of a function block, of function block(s) 114A, that relate to the FT component 111A. For instance, the condition(s) can define a high-high, high, low, and/or low-low limit(s) for a measured flow variable (based on a sensor of the FT component 111A) of the function block. Also, for instance, the condition(s) can define a maximum rate of change of the measured flow variable. As yet another instance, the condition(s) can define a maximum deviation between the measured flow variable and a setpoint for the flow variable. As another example, alarm engine 116A can additionally or alternatively monitor for condition(s) that reference other process variable(s) of an additional function block, of function block(s) 114A, that relate to the actuator component 113A. For instance, the condition(s) can define state(s) of the actuator component 113A as determined based on input(s) to the additional function block.

As described herein, the DCN 110A can obtain the alarm configuration file(s), that define the alarm(s) to be monitored by the alarm engine 116A, from the alarm configuration service 120 and via the process automation network 106. For example, the DCN 110A can transmit, via the process automation network 106 and to the alarm configuration service 120, an alarm configuration request. The DCN 110A can include, in the alarm configuration request, function block identifier(s) of the function block(s) 114A, and can include them based on them being function block(s) 114A that are executed by the DCN 110A and/or based on them being function blocks for which alarm monitoring is to be performed by alarm engine 116A (when corresponding alarm configuration files are obtained). The DCN 110A can transmit the alarm configuration request in response to detecting occurrence of an alarm configuration condition, such as one or one or more alarm configuration conditions described herein.

DCN 110B is coupled, via a first I/O, to a flow transmitter (FT) component 111B and, via a second I/O to a sensor 115B. DCN 110B includes processor(s) 112B that can utilize associated memory (and corresponding instructions stored therein) for implementing corresponding function(s) of the DCN 110B. Those function(s) include implementing function block(s) 114B of DCN 110B, which can be stored in some of the associated memory. Notably, DCN 110B does not include any corresponding alarm engine and, thus, the function(s) implemented by processor(s) 112B do not include implementing any alarm engine. Rather, alarm monitoring pertinent to function block(s) 114B, of DCN 110A, is performed by DCN 110C (described below).

Each of the function block(s) 114B of DCN 110B can define one or more aspects of sensor monitoring and/or actuator control that is performed by DCN 110B. In some implementations, each of the function block(s) 114B is a software model that contains input/output variable(s), through variable(s), internal variable(s), and/or an internal behavior description of the function(s) to be performed by the function block. As a non-limiting example, one of the function block(s) 114B of DCN 110B can control an actuator of FT component 111B based on sensor data from sensor(s) of FT component 111B, sensor data from sensor 115B, and/or sensor data from other sensor(s) (e.g., sensor of FT 111A).

DCN 110C is not coupled to any external component via any I/O and can optionally omit any I/O. Further, DCN 110C does not include any function blocks that it executes. Accordingly, DCN 110C does not implement any function blocks that directly or indirectly "control" any automated process of the process automation system 108. However, processor(s) 112C of DCN 110C do implement an alarm engine 116C that monitors function blocks of other DCN(s) of the process automation system. In some implementations, DCN 110C can be devoted exclusively to alarm monitoring.

Alarm engine 116C can optionally be implemented utilizing open standard protocol(s), such as by an OPC-UA server that is executed on the DCN 110C by processor(s) 112C thereof. The alarm engine 116C can utilize alarm configuration file(s), described herein, in monitoring for occurrence of alarm condition(s) dictated by an alarm configuration file and performing corresponding action(s) if the alarm condition(s) are detected. The condition(s) defined by an alarm configuration file can include, or be restricted to, those that reference process variable(s) of function block(s). The function block(s) to be monitored by alarm engine 116C include those that are not executed by DCN 110C (as DCN 110C does not execute any function blocks). For example, the alarm engine 116C can monitor function block(s) 114B of DCN 110B and/or function block(s) of other DCN(s). For instance, the monitoring of function block(s) 114B, during execution thereof, can be via communications, from DCN 110B, that reflect process variable(s) of the function block(s) 114B during their execution. Such communications can optionally be via a connection-oriented connection between DCN 110B and DCN 110C via e.g., process automation network 106. As one example, alarm engine 116C can monitor for condition(s) that reference process variable(s) of a function block, of function block(s) 114B, that relate to the sensor component 115B. For instance, the condition(s) can define a high-high, high, low, and/or low-low limit(s) for an internal variable, of the function block of function block(s) 114B, that is dependent on sensor data from the sensor 115B.

As described herein, the DCN 110C can obtain the alarm configuration file(s), that define the alarm(s) to be monitored by the alarm engine 116C, from the alarm configuration service 120 and via the process automation network 106. For example, the DCN 110C can transmit, via the process automation network 106 and to the alarm configuration service 120, an alarm configuration request. The DCN 110C can include, in the alarm configuration request, function block identifier(s) of the function block(s) 114B, and can include them based on them being function block(s) for which alarm monitoring is to be performed by alarm engine 116C (when corresponding alarm configuration files are obtained). The DCN 110C can transmit the alarm configuration request in response to detecting alarm configuration condition(s).

DCN 110N is coupled, via a first I/O, to a sensor 115N. DCN 110N includes processor(s) 112N that can utilize associated memory (and corresponding instructions stored therein) for implementing corresponding function(s) of the DCN 110N. Those function(s) include implementing function block(s) 114N of DCN 110N, which can be stored in some of the associated memory. Those function(s) also include implementing an alarm engine 116N. As described herein, the DCN 110N can obtain the alarm configuration file(s), that define the alarm(s) to be monitored by the alarm engine 116N, from the alarm configuration service 120 and via the process automation network 106.

The alarm configuration service 120 is illustrated as including a configuration module 122, a request module 124, and a push module 126. In some implementations, alarm configuration service 120 is implemented within a process automation facility, e.g., within a single building or across a single campus of buildings or other industrial infrastructure. In such an implementation, alarm configuration service 120 may be implemented on one or more local computing systems, such as on one or more server computers. However, in some implementations some or all aspects of alarm configuration service 120 can be implemented in computing system(s) that are remote from the process automation facility. In some of those implementations, the alarm configuration service 120 can be in communication with the process automation network 106 via a wide-area network.

The configuration module 122 can receive alarm configuration files, and assignments of those alarm configuration files to function block identifiers, and store those alarm configuration files and associated function block identifiers in alarms database 125. For example, a first alarm configuration file can be assigned to a first function block identifier of "FT101.PV", a second alarm configuration file can be assigned to a second function block identifier of "FT202.SP", etc. Further, the configuration module 122 can store, in the alarms database 125, the first alarm configuration file and an assignment (e.g., a pointer or other association) of the first alarm configuration file to the "FT101.PV" function block identifier, the second alarm configuration file and an assignment (e.g., a pointer or other association) of the first alarm configuration file to the "FT202.SP" function block identifier, etc.

The alarm configuration files and their associations can be generated based on user interface input(s) from engineer(s) and/or other human(s) implementing and/or maintaining the process automation system 108. In some implementations, some or all of the alarm configuration files and their associations are received via bulk configuration file(s) 135. The bulk configuration files 135 can be, for example, in .csv or other structured or unstructured format, and can be created utilizing one or more programs.

In some implementations, some or all of the alarm configuration files and their associations can be received via an alarm configuration graphical user interface (GUI) 130. The alarm configuration GUI 130 can be implemented via configuration module 122 or can be implemented via a separate component that is at least selectively in communication with the configuration module 122.

The alarm configuration GUI 130 can include graphical interface elements for specifying a function block identifier and for specifying alarm configuration file parameter(s) for the function block identifier. For example, the alarm configuration GUI 130 can include a field for specifying a function block identifier (e.g., from a drop-down menu, via free-form entry, via search or autocomplete based on entered character(s)) and can include field(s) for specifying function block variable(s) and condition(s) for those variable(s). For example, the alarm configuration GUI 130 can enable specification of a function block identifier and, once the function block identifier is specified, can present function block variable(s) for the corresponding function block. Further, each of the function block variable(s) can be selectable and, if selected, corresponding condition(s) for the function block variable(s) can be defined through further interaction with the alarm configuration GUI. The selected function block variable(s) and the condition(s) can then be used to generate a corresponding alarm configuration file, and the corresponding alarm configuration file associated with the function block identifier. Updates to alarm configuration file(s) can be performed via further bulk configuration file(s) and/or via further interaction with the alarm configuration GUI 130. For example, the alarm configuration GUI 130 can enable viewing of, and modification (or even deletion of) existing alarm configuration files in the alarms database 125 (optionally while maintaining their association to function block identifiers and, optionally, to DCN identifiers).

Request module 124 receives and processes alarm configuration requests from DCNs, such as one or more of DCNs 110A-N, that are received via the process automation network 106. An alarm configuration request, received by request module 124, can include function block identifier(s) of function block(s) and, optionally, a DCN identifier of the DCN that transmitted the alarm configuration request. In response to receiving the alarm configuration request, the request module 124 can access alarms database 125 and identify, in the alarms database, function block identifier(s) that match those of the alarm configuration request. Further, the request module 124 can identify the alarm configuration file(s) that are stored in association with the matching function block identifier(s). Yet further, the request module 124 can transmit, via the process automation network and in response to the alarm configuration request and to the DCN that issued the alarm configuration request, the identified alarm configuration file(s). Optionally, the request module 124 can update the alarms database 125 to store an association of the DCN identifier, optionally included with the alarm configuration request, to the identified function block identifier(s) and/or to the identified alarm configuration file(s). In doing so, the request module 124 can remove any stored association(s) of a disparate DCN identifier to the identified function block identifier(s) and/or the identified alarm configuration file(s). As described herein, the alarm viewer 140 and/or the push module 126 can utilize the stored association of the DCN identifier to the identified function block identifier(s) and/or to the identified alarm configuration file(s).

Push module 126 is optional and, when provided can be used to cause updated alarm configuration file(s) to be provided to corresponding DCN(s) that are utilizing pre-updated version(s) of the alarm configuration file(s). For example, in response to an update of an alarm configuration file via alarm configuration GUI, configuration module 122 can store, in alarms database 125, the updated alarm configuration file in association with its function block identifier, while maintaining any association of the function block identifier to a DCN identifier and/or while creating an association of the updated alarm configuration file to the DCN identifier. As described with respect to request module 124, the request module 124 can store, in alarms database 125 association(s) of a DCN identifier to function block identifier(s) and/or alarm configuration file(s) in response to an alarms configuration request, from a corresponding DCN, that includes the function block identifier(s). The push module 126 can identify an updated alarm configuration file in response to a notification from configuration module 122 or in response to recognizing an update in the alarms database 125. In response to identifying an updated alarm configuration file, the push module 126 can cause the updated alarm configuration file to be provided to the DCN that corresponds to the DCN identifier associated with the updated alarm configuration file and/or its associated function block identifiers.

In some implementations, in causing an updated alarm configuration file to be provided to the DCN that corresponds to the DCN identifier, the push module 126 can transmit the updated alarm configuration file to the DCN identifier and independent of any alarm configuration request from the DCN. In some implementations, in causing an updated alarm configuration file to be provided to the DCN that corresponds to the DCN identifier, the push module 126 can transmit, to the DCN identifier, an update request that when received by the DCN, can be determined to be an alarm configuration condition. The DCN can thereafter, when deemed appropriate by the DCN, transmit an alarm configuration request. The alarm configuration request can be processed by the request module 124, and the updated alarm configuration file transmitted, by the request module 124 to the DCN, in response to the alarm configuration request. Implementations where the push module 126 provides the update request in lieu of the updated alarm configuration file enables the DCN, receiving the update request, to determine when it is appropriate to transmit an alarm configuration request and receive the updated alarm configuration file in response. This can ensure the DCN is able to receive and/or process the updated alarm configuration file when it is transmitted and/or can otherwise enable the DCN to manage its resource utilization. For example, the update request can be of a small data size (e.g., a byte or less) and require very little processing when received, whereas the alarm configuration file can be of a larger size (e.g., more than one byte) and require more processing when received (e.g., removal of the pre-updated alarm configuration file and replacement with the updated alarm configuration file). Accordingly, the DCN can receive the update request and determine, locally, when to responsively transmit an alarm configuration request. For example, at a time of receiving the update request the DCN resources may be strained due to controlling of actuator(s) and/or an alarm engine of the DCN detecting current alarm condition(s) are satisfied. Based on one of both of these situations being present, the DCN can wait to issue the alarm configuration request when one or both of these situations is no longer present.

In situations where there is no DCN identifier associated with an updated alarm configuration file, the push module 126 can optionally broadcast an update request via process automation network 106 and to multiple of the DCNs 110A-N of the process automation system 108. The update request, when received by each of the DCNs, can be determined to be an alarm configuration condition. Each DCN can thereafter transmit an alarm configuration request in response. In some implementations, a broadcasted update request can be differentiated from (e.g., comprise different data) an update request transmitted to a single DCN utilizing a DCN identifier. In some of those implementations, DCNs receiving the broadcasted update request can recognize it as such and transmit an alarm configuration request with timing that is based on it being broadcasted. For example, for a DCN broadcast request each DCN can randomly choose a corresponding time delay between 1 and 100 seconds and transmit the alarm configuration request with the randomly selected time delay. This can ensure non-concentrated distribution of transmission of alarm configuration requests, preventing overloading of resources of the process automation network 106 in and/or of the request module 124 in handling the alarm configuration requests.

Alarm viewer 140 can be in communication with alarm engine(s) of DCN(s) 110A-N and can cause rendering, of at least any active alarm(s), via one or more output device(s). For example, the alarm viewer 140 can cause display of at least active alarm(s) via fixed display screen(s) in a process automation facility. Also, for example, the alarm viewer 140 can cause at least some active alarm(s) (e.g., those designated as "high priority" in corresponding alarm configuration file(s)) to be transmitted to mobile phone(s) of individual(s) e.g., as text message alerts or push notification(s) through an alarm application installed on the mobile phone(s). The rendering of an active alarm by alarm viewer 140 can optionally include audible and/or visual rendering of a descriptor that corresponds to the condition(s) that caused the alarm, such as a descriptor defined in the alarm configuration file for the alarm.

An active alarm can be signaled to the alarm viewer 140 based on a transmission from a DCN whose alarm engine determined occurrence of the active alarm. The transmission can include a descriptor of the alarm (e.g., as determined using an alarm configuration file), an identification of the function block and/or process variable(s) that resulted in the alarm, and/or an indication of the alarm configuration file. The alarm viewer 140, in rendering detail(s) on the alarm, can utilize information included in the transmission from the DCN and/or information that is derived, from the alarms database 125, utilizing information included in the transmission.

In various implementations, to ensure low-latency rendering of alarms by the alarm viewer 140 and/or security of alarm viewer 140, connection-oriented connections between the alarm viewer 140 and DCN(s) implementing alarm engine(s) can be desired. In some of those implementations, the alarm viewer 140 can utilize the DCN identifier(s), stored in alarms database 125 by request module 124 and in association with function block identifier(s) and/or alarm configuration file(s), in establishing such connection-oriented connections. This can ensure that connection-oriented connections are established between the alarm viewer 140 and corresponding DCN(s) and can overcome difficulties that arise with determining which DCN(s) implement alarm engine(s) in heterogeneous and/or distributed process automation systems.

FIG. 1 illustrates the example environment 100 at a first point in time, such as during initial commissioning of the process automation system 108. In some implementations, during initial commissioning, one or more of the DCNs 110A-N can initially include locally stored function block(s) (and corresponding function block identifier(s)) and/or locally stored alarm engine(s) (and corresponding function block identifier(s)), but may not have any alarm configuration file(s) stored thereon. After connecting to process automation network 106, such one or more of the DCNs 110A-N can each transmit a corresponding alarm configuration request and, in response, obtain any responsive alarm configuration file(s) from alarm configuration service 120.

Figure 2:
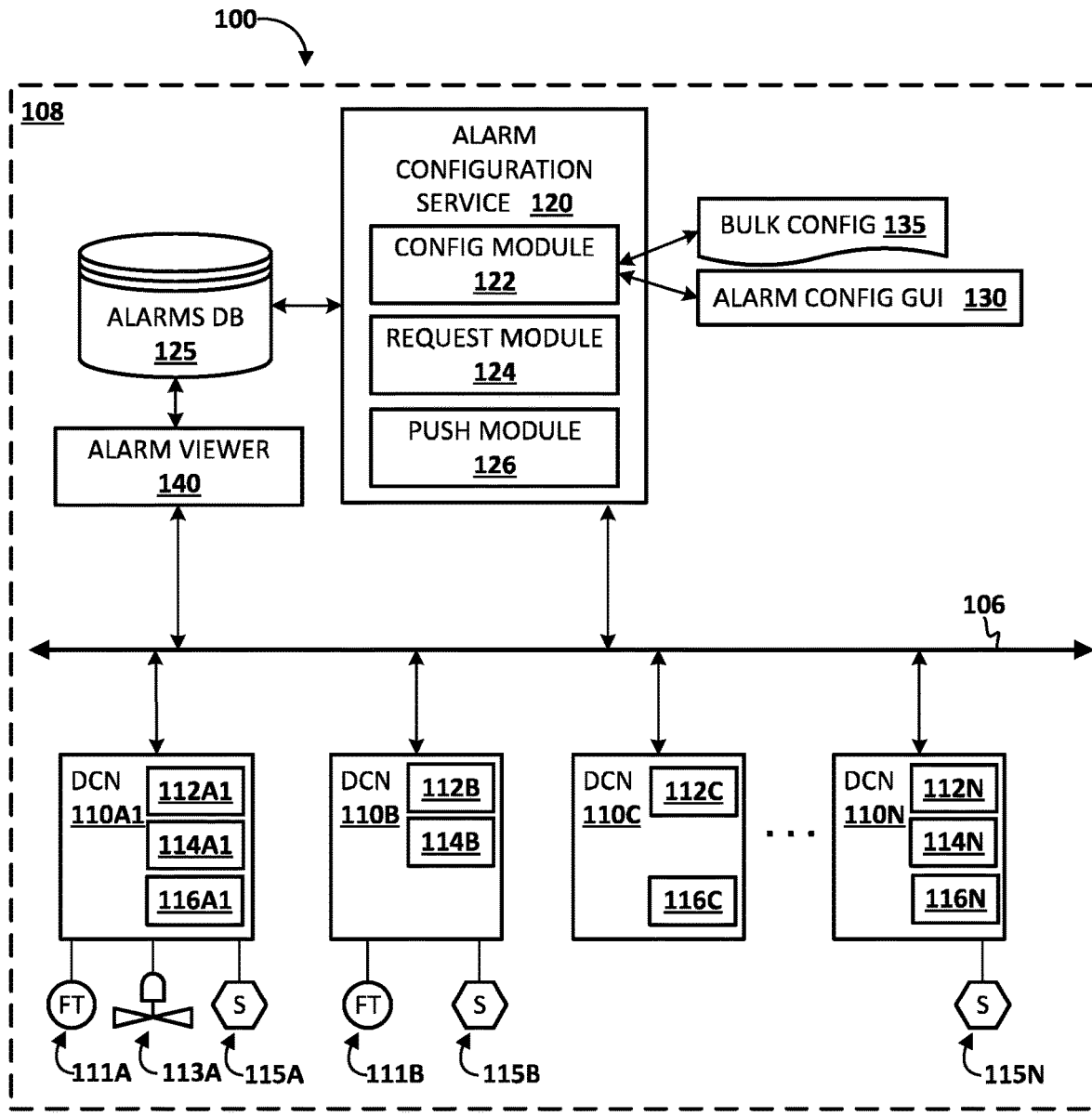
FIG. 2 illustrates the example environment of FIG. 1, after a first DCN of FIG. 1 has been replaced with an alternate DCN.

FIG. 2 illustrates the example environment 100 of FIG. 1, after the DCN 110A of FIG. 1 has been replaced with an alternate DCN 110A1. The alternate DCN 110A1 can replace DNC 110A due to, for example, failure of DCN 110A or the inability of the I/Os of DCN 110A to additionally connect sensor 115A (which is connected to 110A1 in FIG. 2). In FIG. 2, DCN 110A1 is coupled, via a first I/O, to the FT component 111A, is coupled, via a second I/O to the actuator 113A and is coupled, via a third I/O to the sensor 115A. DCN 110A1 includes processor(s) 112 A1 that can utilize associated memory (and corresponding instructions stored therein) for implementing corresponding function(s) of the DCN 110A1. Those function(s) include implementing function block(s) 114A1 of DCN 110A1, which can be stored in some of the associated memory. Those function(s) also include implementing an alarm engine 116A1. In response to commissioning or being powered on, the DCN 110A1 can transmit an alarm configuration request that includes function block identifiers of the function block(s) 114A1 and/or of the function block(s) that are monitored by the alarm engine 116A1, which can include additional function block(s) relative to function block(s) 114A (FIG. 1).

The request module 124 can, in response to the alarm configuration request, identify, from alarms database 125, the alarm configuration file(s) stored in association with the function block identifier(s) of the alarm configuration request. Further, the request module 124 can transmit, to the DCN 110A1, the identified alarm configuration file(s), to cause implementation of the alarm configuration file(s) by the DCN 110A1. Yet further, the request module 124 can optionally update the alarms database 125 to store an association of a DCN identifier, of DCN 110A1, with the alarm configuration file(s) and/or with the function block identifier(s). It is noted that the DCN identifier of DCN 110A1 can be unique relative to the DCN identifier of replaced DCN 110A. Accordingly, updating the alarms database 125 to reflect the DCN identifier of DCN 110A1 can enable alarm viewer 140 to establish a connection-oriented connection with DCN 110A1 and/or can enable effective pushing, of updated alarm configuration file(s), by push module 126. Further, the unique DCN identifier of DCN 110A1 illustrates the robustness of including the function block identifier in the alarm configuration request, and the use thereof by request module 124 in responding to the request. For example, if some of the responsive alarm configuration files had instead been stored only in association with a DCN identifier of DCN 110A, and the DCN identifier of DCN 110A1 included in the request in lieu of the function block identifier(s), the request module 124 would be unable to identify such alarm configuration file(s) in response to the alarm configuration request from DCN 110A1.

Figure 3:
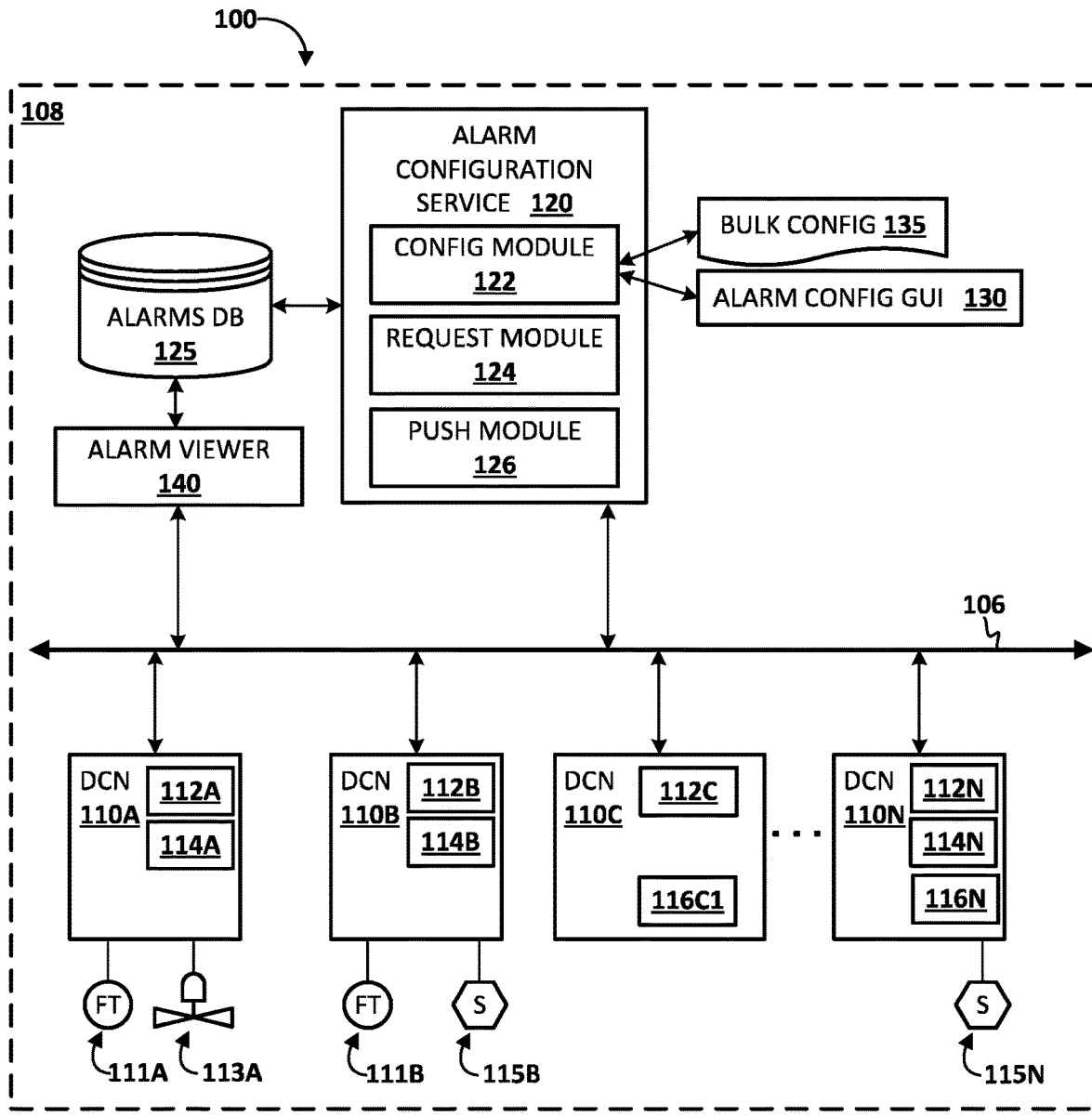
FIG. 3 illustrates the example environment of FIG. 1, after a first DCN of FIG. 1 has been altered to remove alarm monitoring functionality and the alarm monitoring functionality, removed from the first DCN, is implemented on a second DCN.

FIG. 3 illustrates the example environment 100 of FIG. 1, after DCN110A of FIG. 1 has been altered to remove the alarm engine 116A. Further, the alarm engine 116C (FIG. 1) of DCN 110C has been altered so that it now also includes, in its alarm monitoring functionality, the alarm monitoring functionality that was implemented by the alarm engine 116A (removed from the first DCN 110A). In response to detecting an alarm configuration condition, DCN 110C can transmit an alarm configuration request that includes function block identifiers of the function blocks that are monitored by the alarm engine 116C1, which can include those that were previously monitored by alarm engine 116A (FIG. 1).

The request module 124 can, in response to the alarm configuration request, identify, from alarms database 125, the alarm configuration files stored in association with the function block identifiers of the alarm configuration request. Further, the request module 124 can transmit, to the DCN 110C, the identified alarm configuration files, to cause implementation of the alarm configuration files by the DCN 110C. Yet further, the request module 124 can optionally update the alarms database 125 to store an association of a DCN identifier, of DCN 110C, with the alarm configuration files and/or with the function block identifiers.

Figure 4:
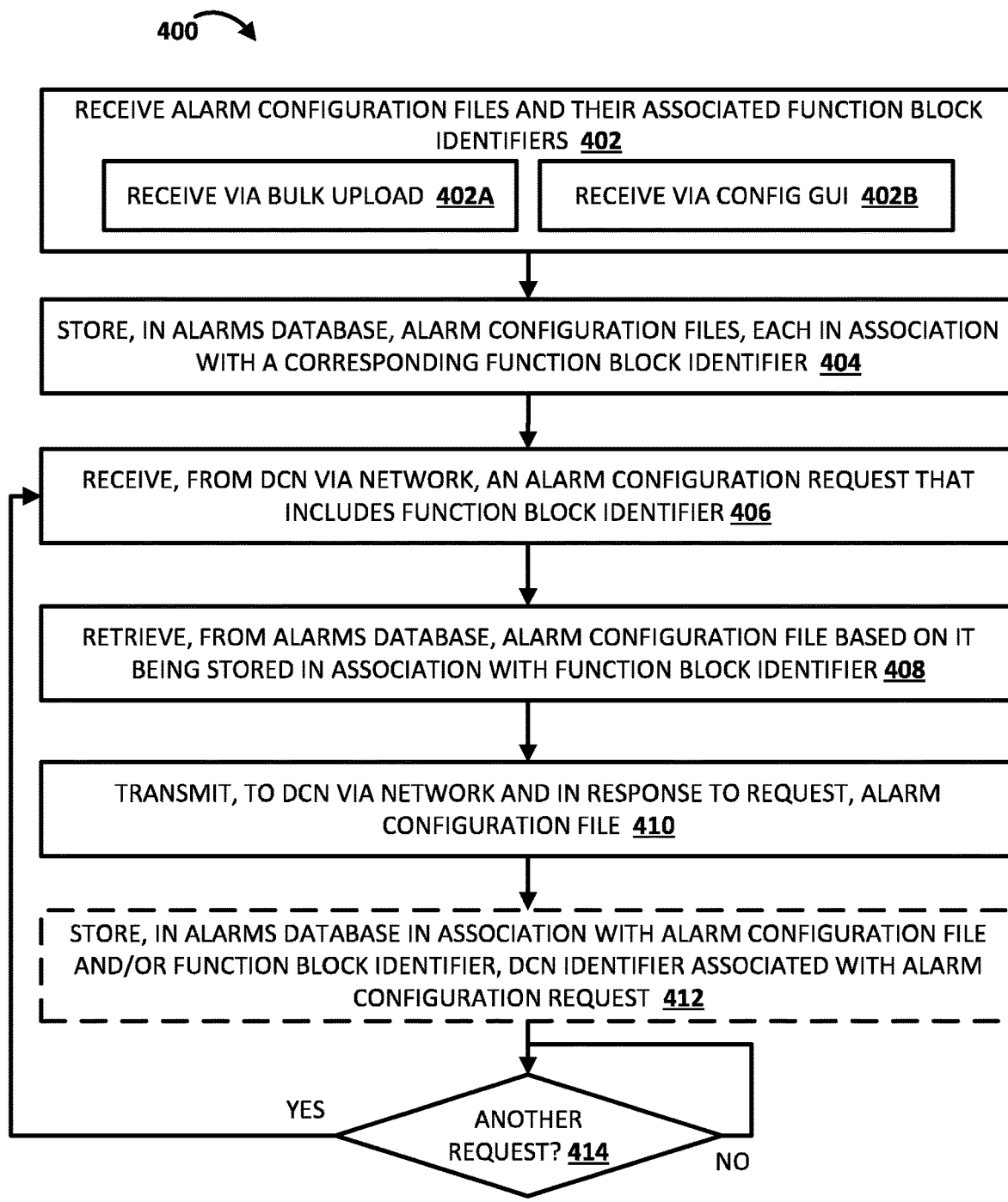
FIG. 4 illustrates an example method of storing alarm configuration files in association with function block identifiers, and transmitting an alarm configuration file in response to an alarm configuration request that includes the function block identifier associated with the alarm configuration file.

FIG. 4 is a flowchart illustrating an example method 400 of storing alarm configuration files in association with function block identifiers, and transmitting an alarm configuration file in response to an alarm configuration request that includes the function block identifier associated with the alarm configuration file. For convenience, the operations of the flow chart are described with reference to a system that performs the operations. This system may include various components of various computer systems, such as alarm configuration service 120. Moreover, while operations of method 400 are shown in a particular order, this is not meant to be limiting. One or more operations may be reordered, omitted or added.

At block 402, the system receives alarm configuration files and their associated function block identifiers. Block 402 can optionally include sub-block 402A and/or sub-block 402B. At sub-block 402A, the system receives at least some of the alarm configuration files and their associated function block identifiers via a bulk upload. At sub-block 402B, the system receives at least some of the alarm configuration files and their associated function block identifiers via interactions of user(s) with an alarm configuration GUI, such as alarm configuration GUI 130.

At block 404, the system stores, in an alarms database, the alarm configuration files received at block 402 and stores, in the alarms database, each of the alarm configuration files in association with a corresponding function block identifier.

At block 406, the system receives, from a DCN and via a process automation network, an alarm configuration request that includes a particular function block identifier and, optionally, additional function block identifier(s). The DCN can include, in the alarm configuration request, the function block identifier(s) based on them being executed by the DCN and/or being monitored by an alarm engine of the DCN.

At block 408, the system retrieves, from the alarms database, an alarm configuration file. The system retrieves the alarm configuration file based on it being stored in association with the function block identifier of the request of block 408. At block 408, the system can also optionally retrieve additional alarm configuration file(s) based on them being stored in association with additional function block identifier(s) of the request of block 408. In various implementations, one or more of the retrieved alarm configuration file(s) can be unique relative to all other alarm configuration files in the database and/or provided to other DCNs in response to other alarm configuration requests. For example, one or more of the retrieved alarm configuration file(s) can have unique condition(s) and/or variable(s), or a unique combination of condition(s) and variable(s), relative to all other alarm configuration files provided to other DCNs in response to other alarm configuration requests.

At block 410, the system transmits, to the DCN, the alarm configuration file retrieved at block 408 and optionally any additional alarm configuration file(s) retrieved at block 408. The system transmits the alarm configuration file(s) in response to the alarm configuration request and via the process automation network.

At optional block 412, the system stores, in the alarm database and in association with the retrieved alarm configuration file and/or the function block identifier of the request, a DCN identifier associated with the alarm configuration request. The system can also store the DCN identifier in association with any additional retrieved alarm configuration file(s) and/or additional function block identifier(s) of the request. The DCN identifier is an identifier of the DCN that transmitted the alarm configuration request. The DCN identifier can be included in the alarm configuration request, or can be determined from e.g., a transmission header associated with the request. The DCN identifier can optionally be a network addressable identifier such as an IP address or a MAC address. In various implementations, when the DCN identifier is stored in association with the alarm configuration file in the database, the DCN identifier can thereafter be utilized by e.g. alarm viewer 140 in establishing a connection-oriented connection with the corresponding DCN. This can enable low-latency and/or secure transmission of alarm data from the corresponding DCN to the alarm viewer 140. In these and other manners, secure and/or prompt rendering of alarms via the alarm viewer can be provided. Further, this is enabled without requiring manual assigning of DCN identifier(s) with which the alarm viewer should establish connection-oriented connection(s).

At block 414, the system awaits an additional alarm configuration request from another DCN. If one is received, the system proceeds back to block 406 and processes the additional alarm configuration request. Although illustrated in a serial manner in method 400, it is noted that multiple alarm configuration requests can be processed in parallel in various implementations.

Figure 5:
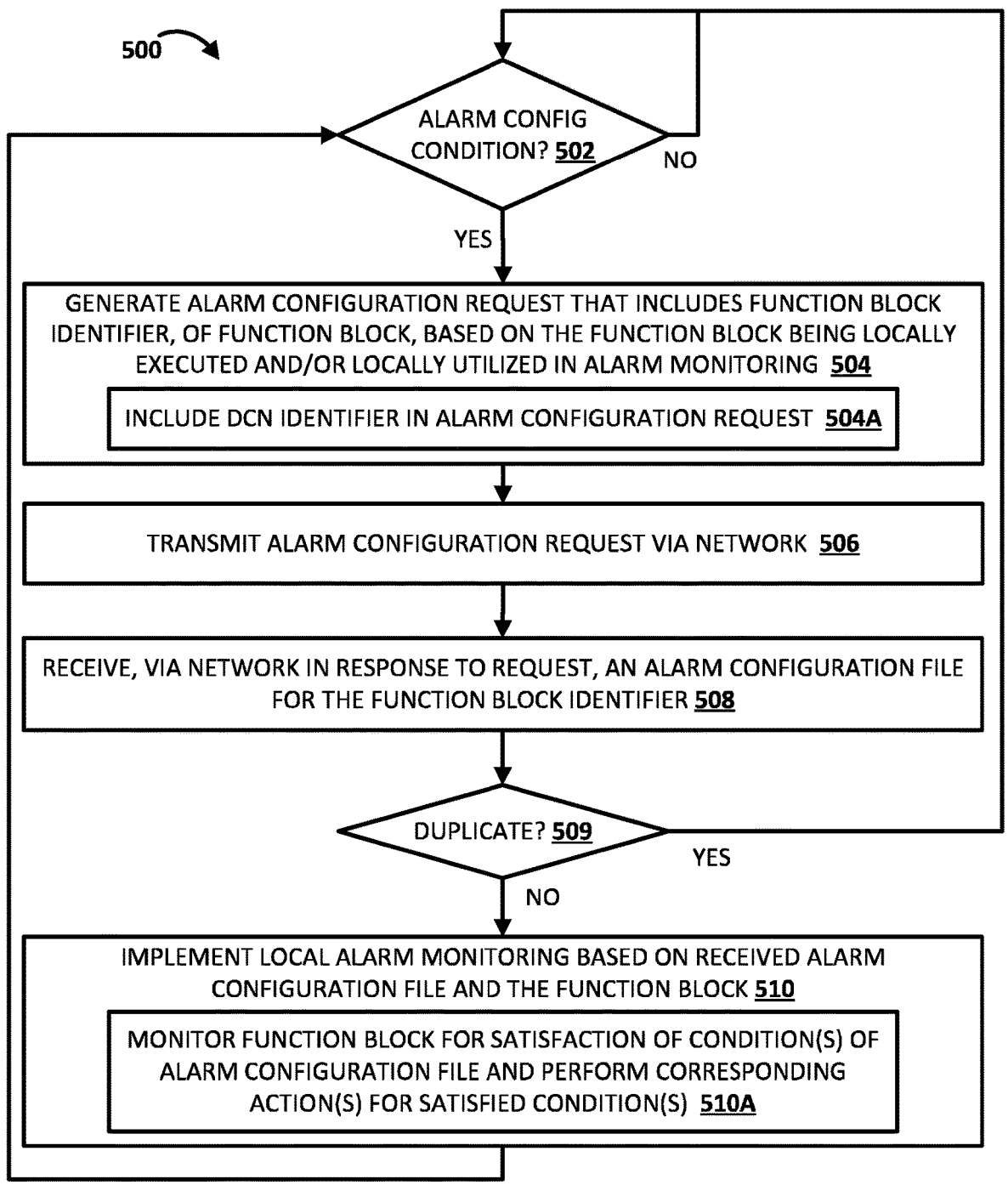
FIG. 5 illustrates an example method of generating and transmitting an alarm configuration request, receiving an alarm configuration file in response, and implementing local alarm monitoring based on the received alarm configuration file.

FIG. 5 is a flowchart illustrating an example method 500 of generating and transmitting an alarm configuration request, receiving an alarm configuration file in response, and implementing local alarm monitoring based on the received alarm configuration file. For convenience, the operations of the flow chart are described with reference to a system that performs the operations. This system may include various components of various computer systems, such as any one of DCNs 110A-N. Moreover, while operations of method 500 are shown in a particular order, this is not meant to be limiting. One or more operations may be reordered, omitted or added.

At block 502, the system monitors for occurrence of an alarm configuration condition. If an alarm configuration condition is detected at block 502, the system proceeds to block 504. In some implementations, at block 502 the system monitors for occurrence of any one of multiple conditions, such as determining it is newly commissioned, determining it has been powered up, determining that its alarm engine is assigned to monitor function block(s) but that monitoring not being currently active, determining that is has been more than a threshold duration of time since it last issued an alarm configuration request, and/or receiving an update request from an alarm configuration service (e.g., from push module 126).

At block 504, the system generates an alarm configuration request that includes a function block identifier, of a function block, based on the function block being locally executed and/or being locally utilized in alarm monitoring. For example, the system can include the function block identifier based on it being assigned for use by an alarm engine, of the system, in alarm monitoring. In some implementations, the alarm configuration request includes multiple function block identifiers, of multiple function blocks, based on them each being locally executed and/or being locally utilized in alarm monitoring.

At block 506, the system transmits the alarm configuration request, generated at block 504, via a process automation network.

At block 508, the system receives, via the process automation network and in response to the request, an alarm configuration file for the function block identifier. At block 508, the system can optionally receive multiple alarm configuration files when, for example, the alarm configuration request includes multiple function block identifiers. In some implementations, the alarm configuration file(s) are received, at block 508, responsive to block 410, of method 400 of FIG. 4, being performed.

At block 509, the system determines whether all of the received alarm configuration files are duplicates. That is, whether all of the received alarm configuration files are already locally stored and being locally utilized by the alarm engine of the system in performing alarm monitoring. If so, the system proceeds back to block 502 and monitors for occurrence of another alarm configuration condition. If not, the system proceeds to block 510.

At block 510, the system implements local alarm monitoring based on the received alarm configuration file (if not a duplicate) and the function block, and based on any additional received alarm configuration file(s) (if not duplicate(s) and corresponding function block(s).

Block 510 can optionally include sub-block 510A. At sub-block 510A, in implementing local alarm monitoring based on the receive alarm configuration file and the function block, the system monitors the function block (e.g., during execution of the function block) for satisfaction of condition(s) of the alarm configuration file and, in response to detecting satisfaction of the condition(s), perform(s) corresponding action(s) for the satisfied condition(s).

Figure 6:
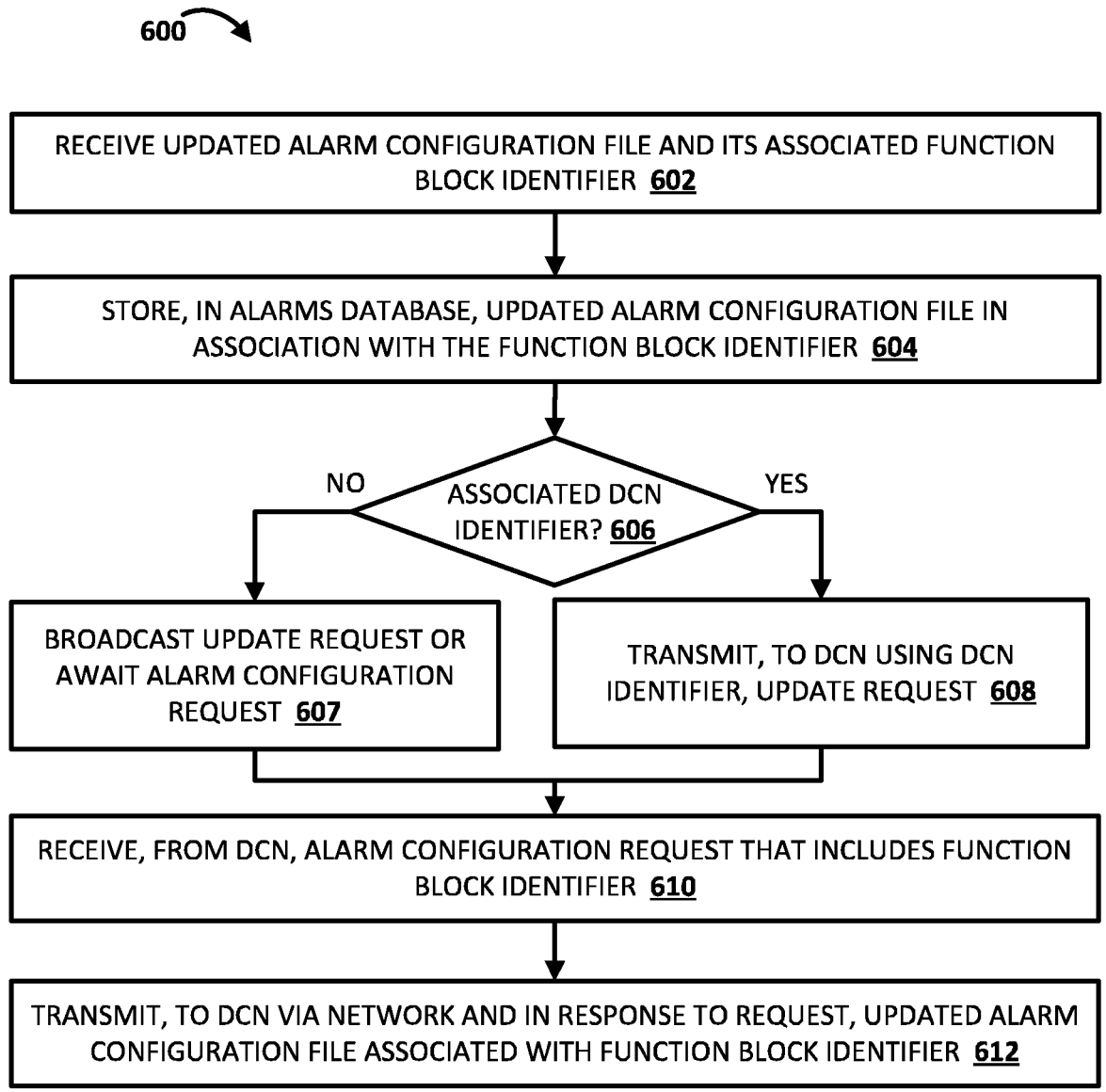
FIG. 6 illustrates an example method of receiving an updated alarm configuration file and its associated function block identifier, and deploying the updated alarm configuration file to a DCN.

FIG. 6 is a flowchart illustrating an example method 600 of receiving an updated alarm configuration file and its associated function block identifier, and deploying the updated alarm configuration file to a DCN. For convenience, the operations of the flow chart are described with reference to a system that performs the operations. This system may include various components of various computer systems, such as alarm configuration service 120. Moreover, while operations of method 400 are shown in a particular order, this is not meant to be limiting. One or more operations may be reordered, omitted or added.

At block 602, the system receives an updated alarm configuration filed and its associated function block identifier. For example, the updated alarm configuration file and its association with the function block identifier can be received via a bulk upload and/or via interaction of a user with an alarm configuration GUI.

At block 604, the system stores, in an alarms database, the updated alarm configuration file in association with the function block identifier. For example, the system can supplant, in the alarms database, a previous alarm configuration file that is associated with the function block identifier, with the updated alarm configuration file—and associate the updated alarm configuration file with the function block identifier.

At block 606, the system determines whether there is an associated DCN identifier stored in association with the function block identifier (and/or the previous alarm configuration file) in the alarms database. If so, at block 608 the system transmits, to the DCN and using the DCN identifier, an update request. For example, the update request can be transmitted directly to the DCN (and not to any other DCNs) and can be a message that informs the DCN that an updated alarm configuration file is available—and can, when received at the DCN, be an alarm configuration condition (e.g., can lead to a "yes" determination in block 502 of method 500).

If the decision at block 608 is no, at block 607 the system broadcasts an update request to all DCNs of the network which, when received at the DCNs, can be an alarm configuration condition for the DCNs. Alternatively, at block 608 the system can instead await for the DCN, associated with the function block identifier, to transmit an alarm configuration request responsive to an alternative alarm configuration condition(s). In some implementations, the system can, at block 608, dynamically determine whether to broadcast the update request or to instead wait for an alarm configuration request from a corresponding DCN responsive to the corresponding DCN detecting alternative condition(s). In some of those implementations, the dynamic determination can be based on a priority of the alarm configuration file, such as a priority level explicitly defined in the alarm configuration file. For example, the dynamic determination can be to broadcast the update request if the priority level is a top priority level, otherwise wait for an alarm configuration request that is responsive to a corresponding DCN detecting alternative condition(s). In some of those implementations, the dynamic determination can additionally or alternatively be based on network conditions of the process automation network and/or determined or estimated current workload of DCN(s) of the process automation system. It is noted that, as described herein, in some implementations the update request optionally sent in block 607 can optionally vary from the update request of block 608, and can be processed differently by receiving DCN(s) as a result. For example, a DCN can act as soon as possible on an update request of block 608, but can optionally delay acting (e.g., based on a randomly selected delay duration) based on an update request of block 607.

At block 610, the system receives, from a DCN, an alarm configuration request that includes the function block identifier, of block 602, that is associated in the alarms database with the updated alarm configuration file. The DCN may have transmitted the alarm configuration request, of block 610, responsive to receiving an update request transmitted at block 608 or broadcast at block 607.

At block 612, the system transmits, to the DCN via the process automation network and in response to the request, the updated alarm configuration file. The system transmits the updated alarm configuration file based on it being stored, in the alarms database, in association with the function block identifier of the alarm configuration request.

Figure 7:
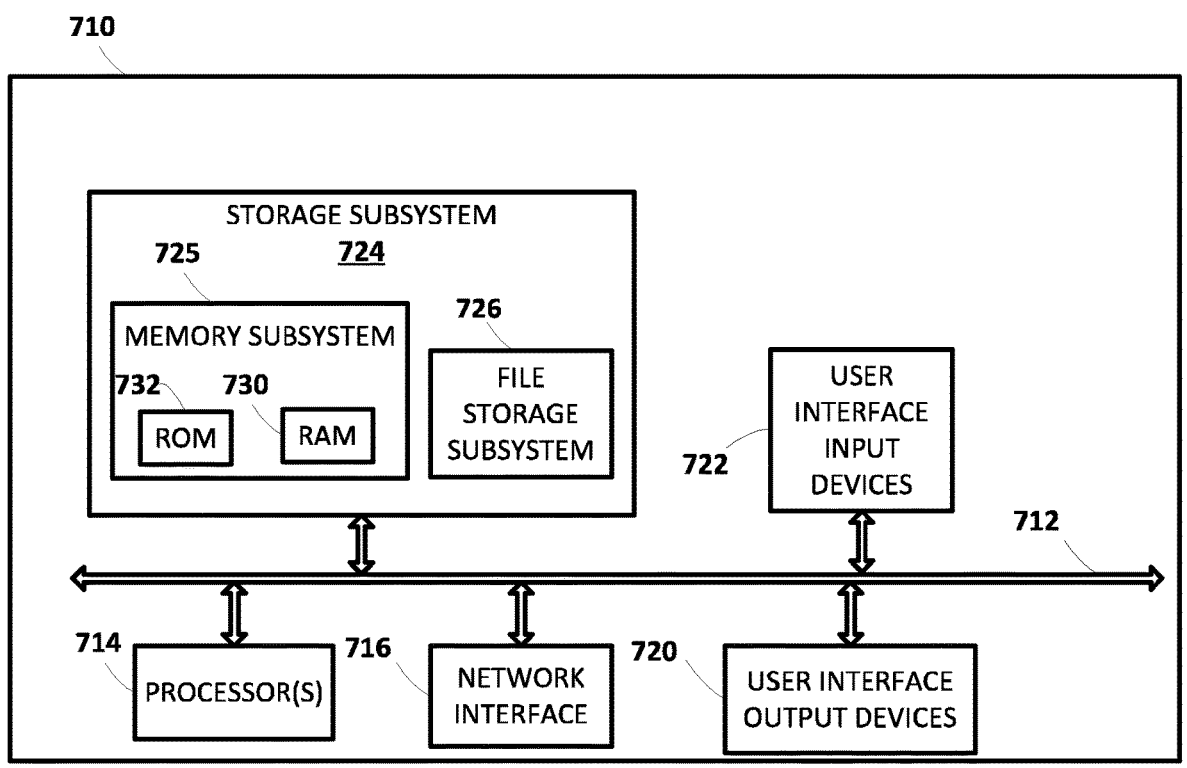
FIG. 7 schematically illustrates an example computer architecture on which selected aspects of the present disclosure can be implemented.

FIG. 7 is a block diagram of an example computing device 710 that may optionally be utilized to perform one or more aspects of techniques described herein. For example, computing device 710 is an example of a computing device that can implement all or parts of alarm configuration service and/or, optionally, all or parts of some DCN(s). Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods of FIGS. 4-6, as well as to implement various components depicted in FIGS. 1-3.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method is provided that includes receiving, via a network of a process automation system, an alarm configuration request transmitted by a distributed control node (DCN) of the process automation system. The alarm configuration request includes a function block identifier of a function block, and includes the function block identifier based on the function block being executed by the DCN and/or being assigned for use in alarm monitoring by the DCN. The method further includes, responsive to receiving the alarm configuration request: retrieving, from an alarms database, an alarm configuration file based on the alarm configuration file being stored in association with the function block identifier and the function block identifier being included in the received alarm configuration request; and transmitting, via the network of the process automation system and to the DCN, the retrieved alarm configuration file. Transmitting the retrieved alarm configuration file causes the DCN to implement alarm monitoring that conforms to the retrieved alarm configuration file.

These and other implementations of the technology disclosed herein can include one or more of the following features.

In some implementations, the alarm configuration file defines an alarm condition that is contingent on one or more outputs of the function block and/or that is contingent on one or more inputs to the function block. In some versions of those implementations, the alarm condition is a threshold value for sensor-based input, of the one or more inputs to the function block. In some additional or alternative versions of those implementations, the alarm condition includes a value previously manually specified, via user interface input, for the function block.

In some implementations, the alarm configuration file is specific to the function block and is not assigned to any other function block of the process automation system.

In some implementations, the function block identifier is specific to the function block and is not assigned to any other function block of the process automation system.

In some implementations, the function block is executed by the DCN and is included in the alarm configuration request based on being executed by the DCN.

In some implementations, the function block is assigned for use, by an alarm engine of the DCN, in alarm monitoring by the DCN, and is included in the alarm configuration request based on being assigned for use, by the alarm engine of the DCN, in alarm monitoring by the DCN.

In some implementations, the function block is executed at an additional DCN that is in communication with the DCN.

In some implementations, the alarm configuration request further includes a DCN identifier that uniquely identifies the DCN relative to all other DCNs of the process automation system. In some versions of those implementations, the method further includes, responsive to receiving the alarm configuration request, storing, in the alarms database, an association of the DCN identifier to the alarm configuration file. In some of those versions, when the alarm configuration request is received the alarm configuration file is stored, in the alarms database, in association with an alternate DCN identifier of an alternate DCN of the process automation system, and the method further includes: removing, from the alarms database, the association of the alarm configuration file with the alternate DCN identifier. The DCN identifier is optionally a network address of the DCN.

In some implementations, at a prior time, prior to receiving the alarm configuration request, the alarm configuration file was locally stored at an alternate DCN, of the process automation system, that previously utilized the alarm configuration file in implementing alarm monitoring for the function block. Further, at a request time, of receiving the alarm configuration request, the alternate DCN is no longer a part of the process automation system or has been reconfigured to no longer implement alarm monitoring for the function block.

In some implementations, a method implemented by hardware processor(s) of a distributed control node (DCN) of a process automation system is provided and includes detecting occurrence of one or more alarm configuration conditions. The method further includes, responsive to detecting the occurrence of the one or more alarm configuration conditions: generating an alarm configuration request, including incorporating, in the alarm configuration request, a function block identifier of a function block based on the function block being executed by the DCN and/or being utilized in alarm monitoring by the DCN; and transmitting, via a network of the process automation system, the alarm configuration request that incorporates the function block identifier. The method further includes receiving, via the network and responsive to transmitting the alarm configuration request, an alarm configuration file that is identified based on the function block identifier, and implementing alarm monitoring based on the received alarm configuration file and the function block.

These and other implementations of the technology disclosed herein can include one or more of the following features.

In some implementations, detecting occurrence of the one or more alarm configuration conditions includes: detecting a powering up of the DCN, detecting that the DCN is newly commissioned in the process automation system, and/or detecting that alarm monitoring, by the DCN for the function block, is not currently active.

In some implementations, the alarm configuration file defines an alarm condition that is contingent on one or more outputs of the function block and/or that is contingent on one or more inputs to the function block.

In some implementations, the function block identifier is specific to the function block and is not assigned to any other function block of the process automation system.

In some implementations, a process automation system is provided that includes an alarms configuration server including: one or more network interfaces communicatively coupled to a network of the process automation system; an alarms database that includes multiple function block specific alarm configuration files and, for each of the function block specific alarm configuration files, a corresponding association to a corresponding function block identifier; and one or more alarm configuration processors. The alarm configuration processor(s) execute stored instructions to receive, via the network, an alarm configuration request that is transmitted by a node of the process automation system, that includes a function block identifier of a function block, and that includes the function block identifier based on the function block being assigned for use in alarm monitoring by the node. In executing the stored instructions the alarm configuration processor(s) are further to, responsive to receiving the alarm configuration request: retrieve, from the alarms database, a particular alarm configuration file based on the corresponding association, for the particular alarm configuration file, being to the function block identifier that is included in the received alarm configuration request; and transmit, via the network and to the node, the retrieved alarm configuration file. Transmitting the retrieved alarm configuration file causes the node to implement alarm monitoring that conforms to the retrieved alarm configuration file.

In some implementations the process automation system further includes the node, and the node is optionally a distributed control node (DCN) that executes the function block.

What is claimed is:

1. A method comprising:
receiving, via a network of a process automation system, an alarm configuration request transmitted by a distributed control node (DCN) of the process automation system,
wherein the alarm configuration request includes a function block identifier of a function block, and includes the function block identifier based on the function block being executed by the DCN and/or being assigned for use in alarm monitoring by the DCN;
responsive to receiving the alarm configuration request that is transmitted by the DCN and that includes the function block identifier:
retrieving, from an alarms database, an alarm configuration file based on the alarm configuration file being stored in association with the function block identifier and the function block identifier being included in the received alarm configuration request; and
transmitting, via the network of the process automation system and to the DCN, the retrieved alarm configuration file,
wherein transmitting the retrieved alarm configuration file causes the DCN to implement alarm monitoring that conforms to the retrieved alarm configuration file.

2. The method of claim 1, wherein the alarm configuration file defines an alarm condition that is contingent on one or more outputs of the function block and/or that is contingent on one or more inputs to the function block.

3. The method of claim 2, wherein the alarm condition is a threshold value for sensor-based input, of the one or more inputs to the function block.

4. The method of claim 2, wherein the alarm condition includes a value previously manually specified, via user interface input, for the function block.

5. The method of claim 1, wherein the alarm configuration file is specific to the function block and is not assigned to any other function block of the process automation system.

6. The method of claim 1, wherein the function block identifier is specific to the function block and is not assigned to any other function block of the process automation system.

7. The method of claim 1, wherein the function block is executed by the DCN and is included in the alarm configuration request based on being executed by the DCN.

8. The method of claim 1, wherein the function block is assigned for use, by an alarm engine of the DCN, in alarm monitoring by the DCN, and is included in the alarm configuration request based on being assigned for use, by the alarm engine of the DCN, in alarm monitoring by the DCN.

9. The method of claim 1, wherein the function block is executed at an additional DCN that is in communication with the DCN.

10. The method of claim 1, wherein the alarm configuration request further includes a DCN identifier that uniquely identifies the DCN relative to all other DCNs of the process automation system.

11. The method of claim 10, further comprising:
responsive to receiving the alarm configuration request:
storing, in the alarms database, an association of the DCN identifier to the alarm configuration file.

12. The method of claim 11, wherein when the alarm configuration request is received the alarm configuration file is stored, in the alarms database, in association with an alternate DCN identifier of an alternate DCN of the process automation system, and further comprising:
removing, from the alarms database, the association of the alarm configuration file with the alternate DCN identifier.

13. The method of claim 12, wherein the DCN identifier is a network address of the DCN.

14. The method of claim 1,
wherein at a prior time, prior to receiving the alarm configuration request, the alarm configuration file was locally stored at an alternate DCN, of the process automation system, that previously utilized the alarm configuration file in implementing alarm monitoring for the function block; and
wherein at a request time, of receiving the alarm configuration request, the alternate DCN is no longer a part of the process automation system or has been reconfigured to no longer implement alarm monitoring for the function block.

15. A method implemented by one or more processors of a distributed control node (DCN) of a process automation system, the method comprising:
detecting occurrence of one or more alarm configuration conditions;
responsive to detecting the occurrence of the one or more alarm configuration conditions:
generating an alarm configuration request, wherein generating the alarm configuration request includes incorporating, in the alarm configuration request, a function block identifier of a function block based on the function block being executed by the DCN and/or being utilized in alarm monitoring by the DCN;
transmitting, via a network of the process automation system, the alarm configuration request that incorporates the function block identifier;
receiving, via the network and responsive to transmitting the alarm configuration request that incorporates the function block identifier, an alarm configuration file that is identified based on the function block identifier; and
implementing alarm monitoring based on the received alarm configuration file and the function block.

16. The method of claim 15, wherein detecting occurrence of the one or more alarm configuration conditions comprises:
detecting a powering up of the DCN,
detecting that the DCN is newly commissioned in the process automation system, and/or
detecting that alarm monitoring, by the DCN for the function block, is not currently active.

17. The method of claim 15, wherein the alarm configuration file defines an alarm condition that is contingent on one or more outputs of the function block and/or that is contingent on one or more inputs to the function block.

18. The method of claim 15, wherein the function block identifier is specific to the function block and is not assigned to any other function block of the process automation system.

19. A process automation system, comprising:
an alarms configuration server including:
one or more network interfaces communicatively coupled to a network of the process automation system;
an alarms database that includes multiple function block specific alarm configuration files and, for each of the function block specific alarm configuration files, a corresponding association to a corresponding function block identifier;
one or more alarm configuration processors executing stored instructions to:
receive, via the network, an alarm configuration request transmitted by a node of the process automation system,
wherein the alarm configuration request includes a function block identifier of a function block, and includes the function block identifier based on the function block being assigned for use in alarm monitoring by the node;
responsive to receiving the alarm configuration request that is transmitted by the DCN and that includes the function block identifier:
retrieve, from the alarms database, a particular alarm configuration file based on the corresponding association, for the particular alarm configuration file, being to the function block identifier that is included in the received alarm configuration request; and
transmit, via the network and to the node, the retrieved alarm configuration file,
wherein transmitting the retrieved alarm configuration file causes the node to implement alarm monitoring that conforms to the retrieved alarm configuration file.

20. The process automation system of claim 19, further comprising the node, and wherein the node is a distributed control node (DCN) that executes the function block.

\* \* \* \* \*